Feb. 20, 1973   J. L. McGREW ETAL   3,717,005
CAPILLARY INSULATION

Filed Oct. 16, 1970   4 Sheets-Sheet 1

INVENTORS
JAY L. McGREW
RICHARD A. SHARP
EUGENE C. MOWREY
DONALD A. THOMAS
JOHN P. GILLE
BY Yount and Tarolli
ATTORNEYS INVENTORS
JAY L. McGREW
RICHARD A. SHARP
EUGENE C. MOWREY
DONALD A. THOMAS
JOHN P. GILLE
BY Yount and Tarolli
ATTORNEYS

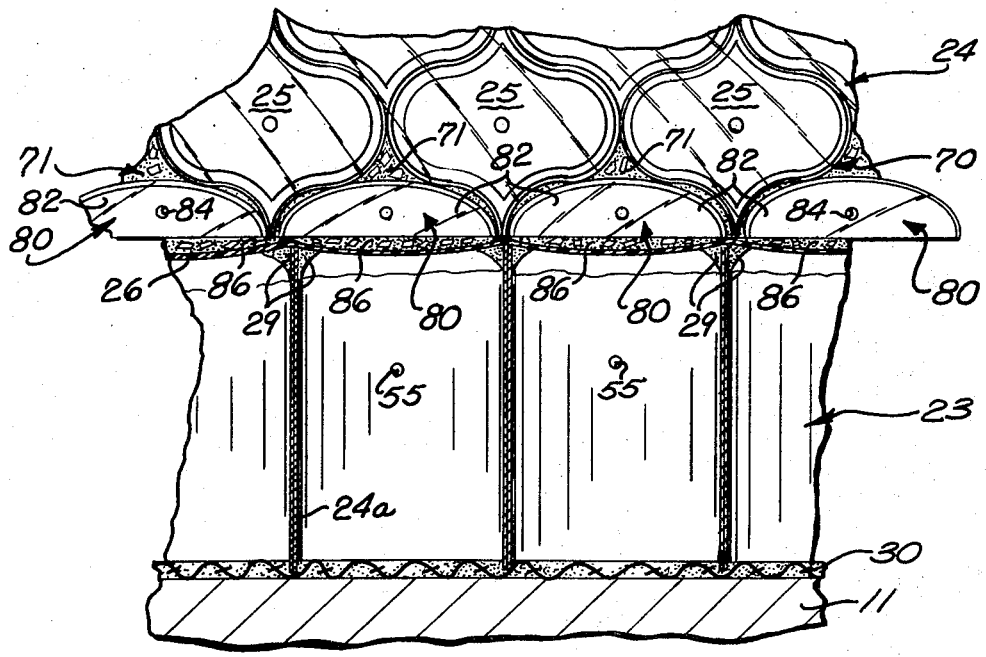
FIG. 6
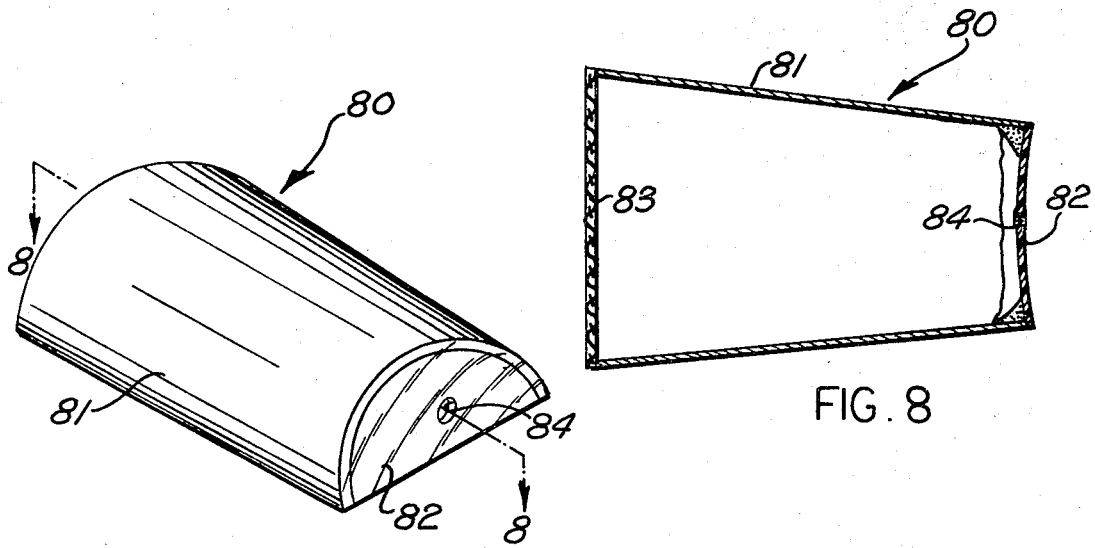
FIG. 7
FIG. 8
INVENTORS
JAY L. McGREW
RICHARD A. SHARP
EUGENE C. MOWREY
DONALD A. THOMAS
JOHN P. GILLE
BY Yount and Tarolli
ATTORNEYS

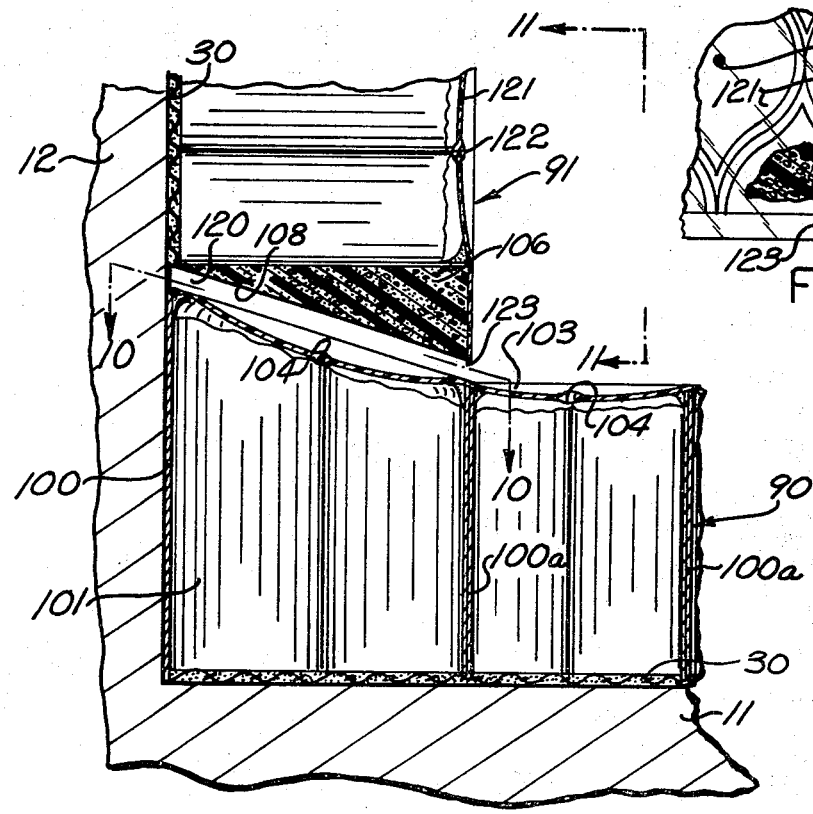

United States Patent Office 3,717,005
Patented Feb. 20, 1973

3,717,005
CAPILLARY INSULATION
Jay L. McGrew, Littleton, Richard A. Sharp, Lakewood, Eugene C. Mowrey, Denver, and Donald A. Thomas and John P. Gille, Littleton, Colo., assignors to Martin Marietta Corporation
Filed Oct. 16, 1970, Ser. No. 81,441
Int. Cl. F17c 1/12
U.S. Cl. 62—45
18 Claims

ABSTRACT OF THE DISCLOSURE

An insulation provides a gas insulating layer between the walls of a container and liquid having a low boiling temperature in the container. The insulation comprises a plurality of panels mounted on the walls of the container. Each of the panels comprises a honeycomb structure defining a plurality of cells for maintaining a gas column between the wall of the container and the liquid. A covering closes the end of the cells adjacent the liquid and has an opening therein for providing a stable capillary gas-liquid interface therein between gas in the cell and liquid in the container. Means is provided for securing the panels to the container for providing a seal therebetween to block the flow of the liquid between the panels and into contact with the walls of the container. A right angle joint in the insulation is provided at right angles of the container and which effectively blocks flow of liquid into contact with the container walls thereat.

---

The present invention relates to insulation for providing a gas insulating layer between the walls of a container and a liquid having a low boiling temperature in the container, and particularly relates to capillary insulation wherein the insulation includes a cell for maintaining the gas insulating layer and having an opening in one end thereof for providing a stable capillary gas-liquid interface between the gas in the cell and the liquid in the container.

The problems of insulating a tank or container for a cryogenic liquid, such as liquid oxygen, liquid hydrogen, etc., have been substantial. Insulations for such cryogens traditionally have involved the use of a double walled vessel with the region between the two tanks filled with insulation. The desirability of an effective insulation which is lightweight and extremely simple in construction has been appreciated for many years, and many efforts have been made to develop such an insulation. Recently, however, such an insulation has been developed and which is termed a "capillary insulation." Application Ser. No. 44,678, filed June 9, 1970, allowed Mar. 24, 1972, and assigned to the assignee of the present invention, discloses the basic concept of such an insulation.

The aforementioned application discloses the insulation as comprising a cellular or honeycomb core which defines a plurality of discrete cells in which a gas column may be established between a tank or container wall and the body of liquid in the tank. A capillary cover substantially covers the liquid side of each cell with the cover having a capillary opening therein. The capillary openings are so designed that a stable capillary gas-liquid interface or membrane is formed in each opening. The gas columns in each cell and their associated stable gas-liquid interfaces isolate the liquid from the walls of the tank. In addition, the gas columns in the cell support the liquid in the container and thereby permit fabrication of the honeycomb core from materials which have a low structural strength and thus may be light in weight.

The honeycomb panels, as disclosed in the above-noted application, are mounted within a tank and form the insulating walls of the tank and function to insulate the liquid from the ambient temperature surrounding the walls. The present application is directed to techniques which are used for mounting of the panels in such a tank in order to obtain the most effective use of the panels as an insulation for a tank. The present invention is particularly concerned with the establishment of a seal between panels which are supported on the walls of the tank in order to prevent movement or flow of the liquid between the panels and into contact with the walls of the tank. The present application is also directed to a technique for mounting the panels on the walls of the tank in order to prevent leakage or gas communication between cells of the insulation. Moreover, the present application is directed to techniques for providing joint surfaces between panels extending at different angles within the tank, and which panels may be mounted on angularly related walls of the container.

The principal object of the present invention is the provision of an effective manner of mounting the capillary insulation panels on a tank or container wall for purposes of insulating the liquid in the container from the ambient environment surrounding the tank.

A more specific object of the present invention is the provision of a new and improved insulation construction wherein suitable techniques are utilized for mounting capillary insulation panels on a tank wall and for preventing communication of the gas between cells.

A further object of the present invention is the provision of a new and improved insulation of the above-noted type, wherein individual capillary insulation panels are mounted on the tank wall and a suitable seal is provided therebetween in order to minimize or prevent the flow of liquid between the panels and into contact with the container wall.

A still further object of the present invention is the provision of a new and improved insulation construction for a tank and wherein provision is made for effectively providing a 90-degree joint between panels and which is extremely effective in providing a suitable joint for insulating the area between the panel which covers one surface of the container and a panel covering another surface of the container and which other surface extends angularly from the first-mentioned surface.

Further objects and advantages of the present invention will be apparent to those skilled in the art to which it relates from the following detailed description of a preferred embodiment thereof, made with reference to the accompanying drawings forming a part of this specification.

Referring to the drawings:
FIG. 1 is a somewhat schematic, perspective view of a tank with portions broken away to show the insulation thereof;
FIG. 2 is a sectional view, taken approximately along the line 2—2 of FIG. 1 and illustrating a portion of the insulation shown in FIG. 1;
FIG. 3 is a sectional view, taken approximately along the line 3—3 of FIG. 1 and illustrating another portion of the insulation of FIG. 1;
FIG. 4 is an enlarged fragmentary view of a portion of the insulation shown in FIG. 1 and illustrating the joint between panels mounted on the walls of the tank of FIG. 1;
FIG. 5 is an enlarged, somewhat schematic view illustrating the joint formed between the panel insulating the bottom of the tank of FIG. 1 and the panel insulating the side walls of the tank of FIG. 1;
FIG. 6 is a sectional view, taken approximately along the line 6—6 of FIG. 5;
FIG. 7 is a perspective view of a cell utilized in the formation of the joint between a bottom panel and a side panel in the tank of FIG. 1;

FIG. 8 is a sectional view, taken approximately along line 8—8 of FIG. 7;

FIG. 9 is a sectional view, similar to that of FIG. 5, but illustrating a modification of the construction shown in FIG. 5;

FIG. 10 is a view taken approximately along the line 10—10 of FIG. 9; and

FIG. 11 is another view of the embodiment illustrated in FIG. 9 taken approximately along the line 11—11 thereof.

As noted hereinabove, the present invention relates to capillary insulation which is disclosed and described in detail in copending application Ser. No. 44,678 filed June 9, 1970, allowed Mar. 24, 1972, and assigned to the assignee of the present invention. The above-mentioned application discloses an insulation for providing a gas insulating layer between the walls of a tank or container and a liquid having a low boiling temperature which is in the container. Such liquid may be liquid hydrogen, liquid oxygen, or liquid nitrogen. The aforementioned application discloses the capillary insulation as comprising a cellular honeycomb core having a cover covering one end of the cells and in which an opening is provided. The opening is sized such that a stable capillary gas-liquid interface is provided in the opening. After the panels are positioned on the container walls and the liquid is poured therein, the liquid, as it enters each cell, will vaporize and establish a gas therein. The stable capillary gas-liquid interface or membrane which is provided maintains the gas within the cell and prevents the liquid from entering the cell. The liquid will thus be supported by the gas in the cells. For further details of the construction of the insulation in general and the operation thereof, reference may be made to the afore-mentioned copending application.

The present application is directed to techniques for mounting the afore-mentioned capillary insulation within the container so as to provide for effective insulation of the container and minimize problems which may result from the use of the panels.

Figure 1:
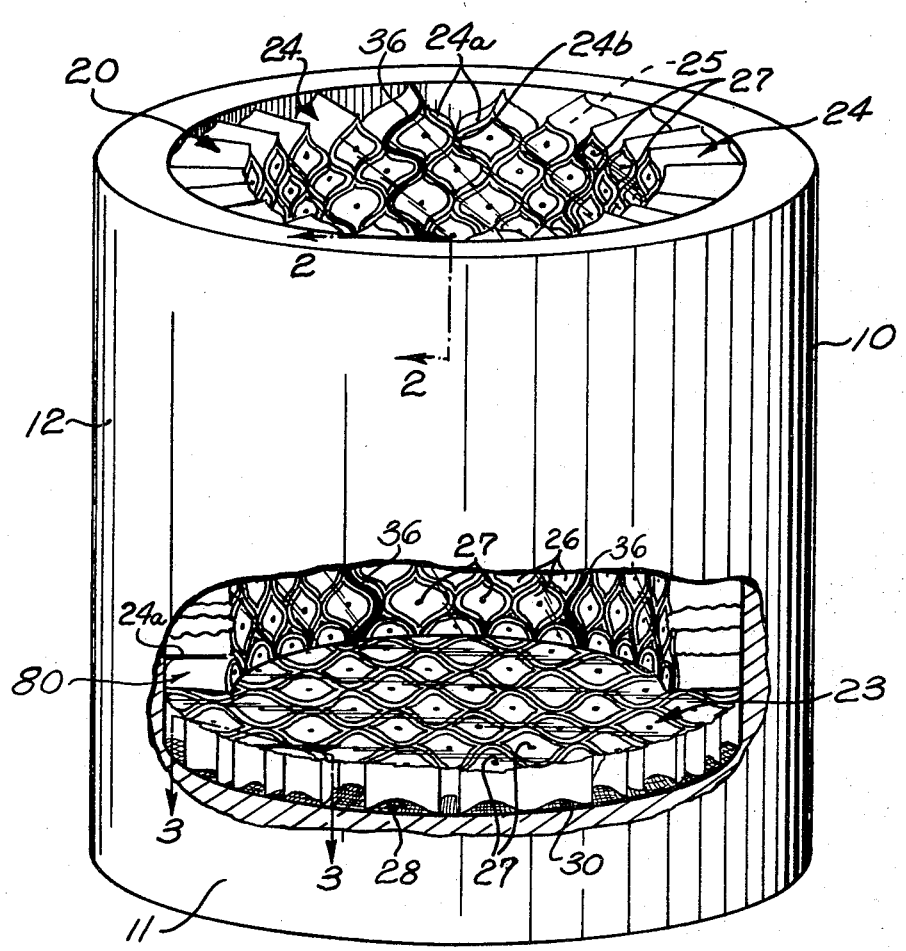

The techniques disclosed in the present application may be applied to a number of different constructions and designs of capillary insulations and to tanks of different shapes and designs. As illustrated herein and as shown in FIG. 1, this application discloses the use of the insulation and improved techniques for mounting the insulation within a container or tank 10. The container 10, for purposes of illustration, is shaped as a cylinder and includes a bottom 11 and a cylindrical side wall 12 extending vertically from the bottom. The container is illustrated in FIG. 1 as being open at the top, but would have a suitable cover.

The container 10 is provided with a complete insulating lining which is generally designated 20. The insulating lining is of the capillary-insulation type. The insulating lining 20 is comprised of a plurality of insulating panels. The insulating panels are suitably secured to the walls of the container and provide the gas insulating layer between the walls of the container and the liquid therein. The number, size, and shape of the panels is optional and depends upon the size of the container and the shape of the container. As illustrated in FIG. 1, the container is provided with a panel or panels 23 which covers the bottom 11 of the container 10 and a plurality of panels, each designated 24, which are utilized for covering the cylindrical side wall 12 of the container 10. In the illustrated embodiment, the panels 24 have a vertical length equal to the vertical height of the wall 12, but, obviously from the description hereinbelow, a plurality of panels could be used to cover this length.

Each panel, as illustrated in the drawings, comprises a honeycomb construction made of a plurality of ribbons 24a which are interconnected at nodes 24b. The ribbons have a serpentine shape and the interconnection of adjacent ribbons at the nodes define between adjacent ribbons a plurality of cells which are designated 25. Each cell is closed at one end by a cover 26 made of suitable material such as Mylar film. The cover 26 has an opening 27 therein. The opening 27 is sized so as to provide a capillary stable liquid-gas interface between the gas in the cell and the liquid in the gas in the cell and the liquid in the container. The panel has a suitable covering for the rear ends of the cells, which in the present embodiment is illustrated as cheese cloth 28 which covers the back side of the cell. The cheese cloth 28 is applied after the cells are filled with a suitable filler, such as rock wool, polystyrene chips, fiberglass or the like, to reduce convection currents and radiation heat transfer.

When a granular material, such as polystyrene chips, is used as a filler for the cells, it is necessary to provide a mat of resilient material, such as fiberglass, in the bottom of the cell to provide a compressive spring force on the granular filler. This resilient force prevents the granular material from settling out and thereby provide voids through which convection currents and radiation can be established. This flexible arrangement also provides for deformation of the cells due to cooling. The described filler is not shown in the drawings.

Figure 2:
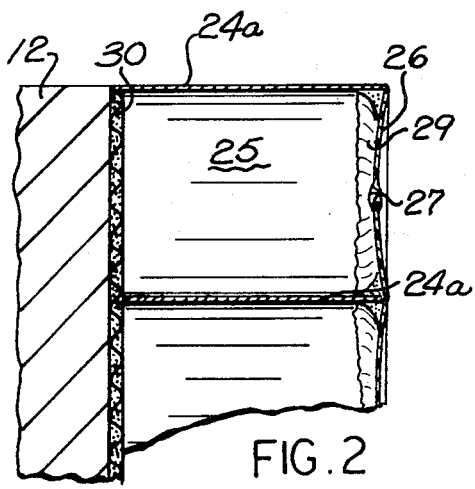

As best illustrated in FIG. 2, the covering 26 is secured to the ribbons 24a which define the cells 25 by glue or suitable adhesive 29 which forms a fillet between the ribbon and the cover. Moreover, the openings 27 are formed by a heated needle which forms a reinforcing ring around the openings 27. The cover also is formed with dimples or a concave shape so that the cover extends slightly downwardly into each individual cell. These various features and advantages thereof are described in copending application Serial No. 81,400, filed Oct. 16, 1790.

Suitable means is provided to secure the individual panels 24 to the wall 12 of the container 10. As illustrated in FIG. 2, an adhesive coating or layer is applied to the walls of the container and the cheese cloth backing 28 of the cells is forced into the adhesive layer. The cheese cloth, as a result, prevents or minimizes the running or possible gravitational flow of the adhesive down the wall of the container.

In the preferred embodiment, the adhesive is made highly viscous by the addition of a sealing agent, such as the gelling agent manufactured under the trade name Cab-O-Sil. This prevents or minimizes unwanted running or gravitation flow. Also, the cheese cloth becomes embedded in the adhesive and, as a result, an effective seal layer, designated 30 in FIG. 2, is provided so as to prevent the flow of gas from one cell to the adjacent cell around or through the cheese cloth. This layer 30 is particularly effective, since the edges of the ribbons 24a are also somewhat embedded therein, as shown in FIG. 2. Because of this manner of mounting the cells on the container wall, the panels are securely and effectively mounted in position and also the possibility of flow of gas from one cell to the next adjacent cell is eliminated. As described in the aforementioned application, Ser. No. 81,400 the flow of gas between cells could destroy the effectiveness of both of those cells.

Figure 3:
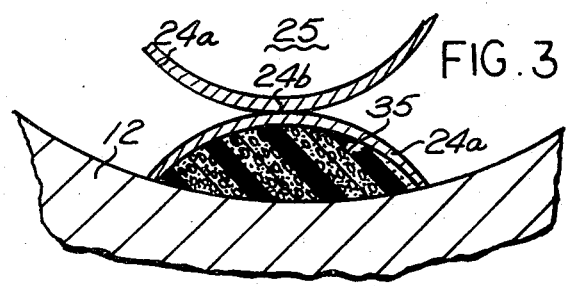

As illustrated in FIG. 2, the panels 24 on the side wall 12 of the container 10 are applied to the side wall 12 by the use of an adhesive into which the cheese cloth backing on the panels is embedded; the panel 23 forming the bottom of the container is in a like manner adhered to the bottom of the container. Moreover, the panel 23 is also subject to leakage between the side wall 12 of the container and the periphery thereof. In order to minimize the possibility of leakage in this manner, a suitable sealer is provided between the periphery of the panel 23 and the side wall 12. In the present embodiment and as illustrated in FIG. 3, a suitable adhesive or foam 35 is applied around the periphery of the panel in order to effectively provide a seal therebetween. The adhesive or foam provides an effective seal, even though it is subjected to substantially low temperatures in the environment in which it is used.

Prior to positioning the panel 23 on the bottom 11 of the container, the panel 23 may be cut to the shape of the bottom. In such event, portions of the ribbon 24a defining a cell may project from the remaining panel. Such a partial cell is shown in FIG. 3 and is sealed with an adhesive and cork mixture or a rigid foam such as polyurethane.

From the above, it should be apparent that in order to effectively line the container, the bottom of the container has an adhesive applied thereto and the panel 23 is cut to conform with the bottom of the container, and the cheese cloth backing on the panel is applied against the adhesive. After the bottom panel 23 is positioned in the container, the adhesive or foam mixture 35 is applied around the periphery of the panel or panels 23. After the bottom 11 of the container 10 is provided with an insulating layer, the panels 24 forming the insulating side walls 12 of the container 10 are positioned on the container wall. These, as noted above, are positioned and located on the container wall by applying a layer of adhesive to the container wall and positioning, or embedding, or forcing the cheese cloth backing of the panels into the layer of adhesive in order to secure the individual panels to the container wall.

In a container construction in which a number of panels 24 are provided in order to complete the container wall, the panels may be individually formed or shaped in order to conform somewhat to the container wall. Likewise, the panels may be tensioned as described in copending application Ser. No. 81,442, filed Oct. 16, 1970. In the present application, the panels are preferably curved somewhat to the configuration of the cylindrical wall 12 of the container. A panel, however, is not large enough to extend all the way around the container wall, but rather a plurality of panels is provided in order to circumferentially cover the wall 12.

In view of the fact that a plurality of panels are necessary to cover the wall 12, a seal between adjacent sides of individual panels is provided. The seal, of course, is necessary in order to prevent the flow of fluid between adjacent panels and into contact with the container wall. If the liquid in the container contacts the container wall, the liquid, depending upon the material of the container, could detrimentally affect the material and could provide substantial problems; particularly in the case of a metal container with the liquid being at substantially low temperatures. In such a case, the container wall could become very brittle, and would be subject to ready rupture. Moreover, it should be obvious that preventing contact of the liquid within the container with the container walls is extremely important to the provision of an effective insulation.

Figure 4:
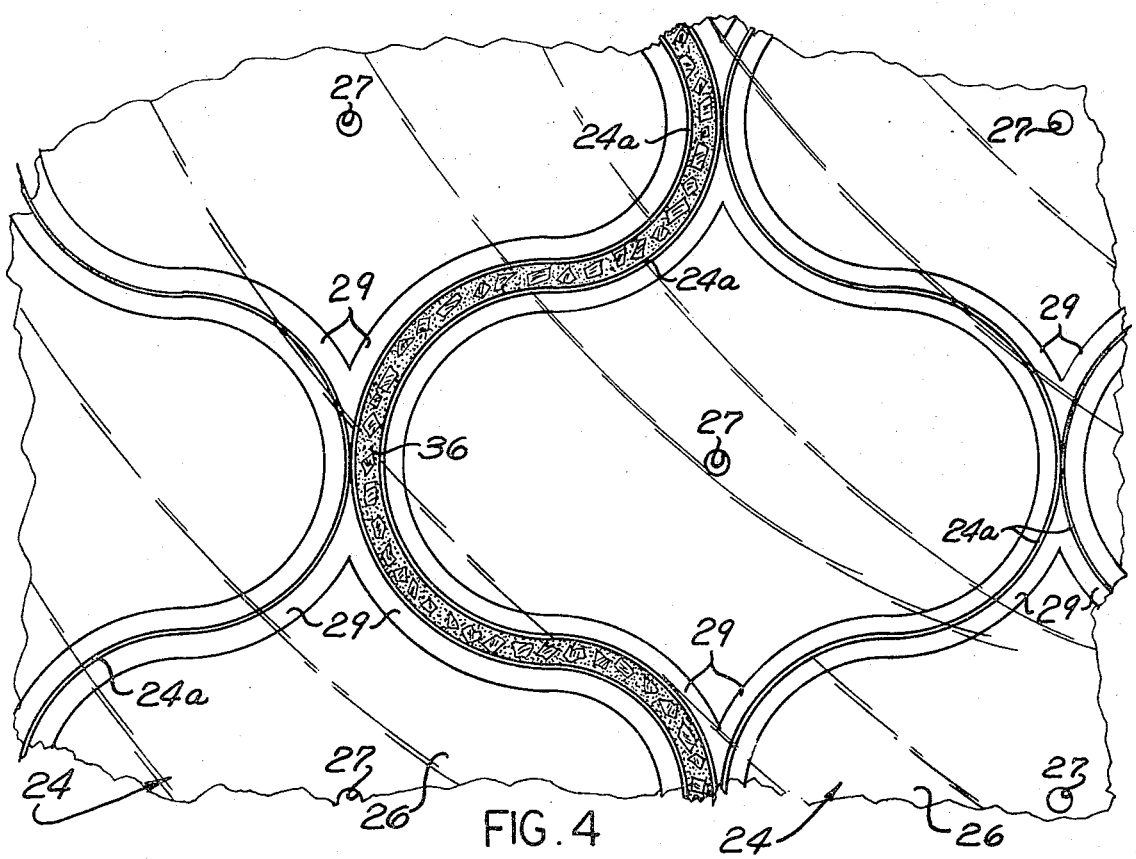

In order to prevent the flow of liquid between the panels 24 and into contact with the panel wall 12, the present invention contemplates a suitable seal 36 provided between the adjacent panels. The seal 36 may be formed of a suitable adhesive and a pulverized cork mixture. The seal 36 may be made of Crest 7343/7139, which is a polyurethane adhesive, and prime mill cork mixture. The mixture must be viscous enough to flow into the area between the panels under suitable pressures. The mixture can be 8 grams of prime mill cork to 100 grams of Crest. It should be apparent from FIG. 4 that the adjacent panels 24 are, in effect, interdigitated, with the ribbon 24a forming the periphery of the panel on the left extending in a complementary manner to the ribbon 24a forming the periphery of the panel on the right. As a result of this interfitting engagement of the ribbons and the use of the seal 36 between the panels, an effective seal is provided between the panels so as to prevent the flow of liquid between panels and into contact with the container wall. Also, little loss of insulation effectiveness is provided thereby. Moreover, the width of the seal material is narrow so as to minimize stress problems within the seal material which would be created if the material was too wide. By having the seal material narrow and serpentine, the material can flex under temperature changes.

As illustrated in FIG. 1, the container wall 12 extends angularly relative to the bottom wall 11 of the container 10, and the bottom of the panel 23 which is utilized to form the gas insulating layer between the liquid in the container and the container wall 11 extends out to the periphery of the wall 11 and adjacent to the wall 12. The panels which are positioned on the side wall 12 of the container 10 overlie a portion of the periphery of the panel 23 and, in fact, overlie some of the cells 25 on the periphery of the panel 23. As a result of this construction, two problems result. One relates to the effectiveness of the cells in the panel 23 which are covered by the panels 24 secured to the side wall, and the other relates to the corner joint between the bottom panel 23 and the panels 24 secured to the side wall 12.

Figure 5:
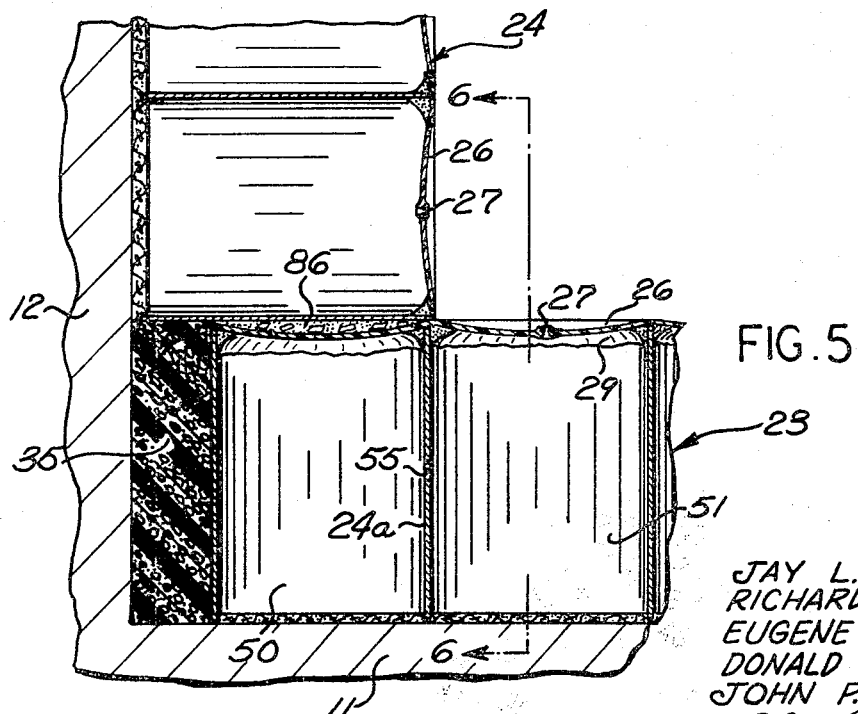

As illustrated in FIG. 5, a cell designated 50 is positioned beneath and is, in effect, rendered inoperative or ineffective by the panel 24 which is secured to the side wall 12 of the container and which overlies the panel 23. As a result, any opening formed in the cover member 26 for the cell 50 would be ineffective to form a stable capillary gas-liquid interface between gas in the cell 50 and liquid, since the opening would not be in contact with the liquid in the container and, as a result, no gas would be established in the cell 50.

It is extremely desirable to provide a gas insulating layer in each cell, even the cell 50, because the cell 50 does function to support the liquid in the container and also does provide an insulation across the corner of the container wall. Accordingly, in order to provide the gas insulating layer in the cell 50, an opening 55 is provided in the ribbon 24a which defines the cell 50 and the adjacent cell 51. This opening provides for gas or vapor communication between the cell 50 and the cell 51 and by appropriately sizing the opening 27 in the cover 26 for the cell 51, a suitable stable capillary gas-liquid interface can be established in the opening 27 between the liquid in the container and the gas in the cells 50 and 51. The size of the opening 55 is not critical but merely provides gas communication between the cells 50 and 51. Accordingly, as a result of this construction, the cell 50 is provided with a gas therein which does function as an insulator and also functions to transmit loads to the container wall.

Insofar as the corner joint between a panel 24 and a panel 23 is concerned, the panel 24 has a bottom surface, best seen in FIG. 6, and designated 70. Openings or spaces 71 are located along the bottom edge of the panel between the lowermost cells 25 therein. These spaces 71 would provide a direct communication for liquid to flow directly into engagement with the container wall.

In accordance with the present invention, provision is made for avoiding flow of liquid through such spaces by the use of individual cells 80, one of which is shown in FIGS. 7 and 8. The individual cells 80 are formed of the same material as the panels and are formed of a ribbon of material 81 defining the cell body. The material of which the ribbon 81 is made may be either Kraft paper or plastic-coated Nomex. A suitable cover 82 covers one end of the cell 80 and a cheese cloth backing 83 may be provided thereon. The cells may be individually filled with suitable material, such as polystyrene chips, to avoid or minimize radiation or convection currents within the cell. Also, the cell is provided with an opening 94 in the cover 82 to provide a stable capillary gas-liquid interface between the gas in the cell and the liquid in the container.

As best shown in FIG. 8, the individual cells 80, insofar as the embodiment of FIG. 1 is concerned, are tapered in configuration. Since the cells are used in the cylindrical container 10, the back wall 83 thereof is somewhat wider than the front cover 82 thereof. As a result, the cell will conform somewhat to the shape of the space 71. These individual cells are inserted into the space 71, as best seen in FIG. 6, and a suitable adhesive sealer 96, which may be the aforementioned polyurethane foam or the Crest and cork mixture, is injected around the cell 80 and provides a seal between the upper panel 24 and the lower panel 23 and the cells 80. In this manner, when the liquid is poured into the container, a gas column is established in the individual cells 80 and these cells, as do the panels 24, provide for insulating the liquid in the container.

FIGS. 9 and 10 illustrate the modified construction providing the joint between a bottom panel 90 and a side panel 91. It should be noted from FIGS. 9 and 10 that the panel 90 covers the bottom wall 11 of the container while panel 91 is secured to the cylindrical wall 12 of the container. The bottom panel 90 is manufactured of a plurality of ribbons which form the honeycomb core structure for the panel 90. The ribbon 100 extending around the periphery of the panel 90 and adjacent the container wall 12 has a greater height or width, as illustrated in FIG. 9, than the other ribbons 100a in the honeycomb core structure. As a result, the periphery of the panel 90 has cells therein designated 101 which have an inclined upper surface and are generally trapezoidal in shape. A cover sheet 103 extends over all the cells and is provided with capillary openings 104 for providing a stable capillary interface for the cells including the cell 101. As shown in FIG. 10, a suitable sealer such as polyurethane foam 35a is provided between the ribbon 100 and the wall 12 where partial cells exist, in the same manner as described in connection with FIG. 3.

The side panels 91 also include a honeycomb core structure made of ribbon material, as described hereinabove in connection with the other panels. The end of the panel 91 is provided with a wedge-shaped form of polyurethane foam. The wedge-shaped form 106 is provided by filling one cell of the panel 91 with polyurethane foam and then cutting that cell at an angle through the polyurethane foam to provide the wedge-shaped form. The lower wall 108 of the form 106 is inclined and extends substantially parallel to the portion of the cover 103 which closes the cell 101.

As a result of the above-described construction, an inclined space 120 is formed between the form 106 and the cell 100. This inclined space extends from the liquid upwardly from the bottom panel toward the outside wall 12 of the container and contacts the outside wall of the container. At the liquid side of the space 120, the cover 121 in which the capillary openings 122 are formed for the cells in the panel 91, extends below the form 106, as illustrated at 123 in FIG. 9.

The construction of the 90-degree joint illustrated in FIGS. 9 and 10 provides for an extremely effective joint at the intersection of the panels 90, 91. As the liquid is poured into a container having the joint illustrated in FIG. 9, the liquid, of course, impinges on the cover 103, and as described hereinabove, the liquid flows through the capillary openings in the cover 103 and into the cells of the panel 90 in which the liquid vaporizes and the stable capillary interface is established for each cell. As the liquid continues to be flowed into the container, the liquid flows up the space 120 and as the liquid flows up the space 120, it vaporizes and fills the space 120 and also a gas is established in the cell 101 and a stable liquid gas interface is established in the opening 104 for the cell 100 if the liquid extends that far into the space 120. Further filling of the container with the liquid results in the liquid filling the container and the cells in the side panels being filled with a gas and the stable capillary interface being established in the openings 122 for the cells.

Accordingly, it should be apparent that the space 120 is filled with a vapor barrier which insulates the container wall 122 from the liquid within the container in much the same manner as the gas in the cells insulates the liquid from the container wall 12. Moreover, it should be apparent that the structures which define the inclined space comprises a means for controlling the flow of liquid through the space 120 and into contact with the container wall. This means, of course, prevents such flow so as to prevent the problems which are created in the event of contact of the liquid with the container wall.

Having described the invention, the following is claimed:

1. Insulation for providing a gas insulating layer between first and second angularly related walls of a container and a liquid having a low boiling temperature in the container, said insulation comprising:
   at least one panel mounted on the first wall of the container and having an end adjacent the second wall of the container,
   a second panel mounted on the second wall and having an end adjacent the first panel and opposite the first panel and defining a space therebetween,
   each of said panels comprising a honeycomb core structure means defining a plurality of cells for maintaining a gas column between the respective walls of the container and the liquid,
   a covering means closing the end of cells of each panel adjacent the liquid and having an opening therein for providing a stable capillary gas-liquid interface thereat between gas in the cells and liquid in the container so that none of the liquid penetrates the cells during steady state conditions, and
   means providing for control of flow of the low boiling temperature liquid through said space and into contact with a wall of the container thereat.

2. The insulation of claim 1 wherein said last mentioned means comprises a discrete cell having an opening for providing a stable capillary gas-liquid interface in the opening.

3. The insulation of claim 2 wherein said cell in said space is tubular in configuration and has a covering on at least one end, said opening being located in said covering.

4. The insulation of claim 1 wherein said last mentioned means comprises adjacent surfaces of said first and second panels which define an inclined space therebetween which inclines upwardly and outwardly of the container.

5. The insulation of claim 4 wherein the surface on said first panel defining said inclined space comprises the covering closing the end of a cell located opposite the first panel, said cell located opposite the first panel being defined by ribbons of different heights thereby providing the cell with a trapezoidal cross-sectional shape.

6. The insulation of claim 1 wherein said honeycomb core structure means includes a plurality of ribbons defining said cells and said second panel overlies cells in said first panel and blocks them from contact with the liquid and means for establishing gas communication between a blocked cell in said first panel and an adjacent cell.

7. Insulation for providing a gas insulating layer between the walls of a container and a liquid having a low boiling temperature in the container, said insulation comprising:
   means defining a single discrete individual cell for maintaining a gas column between the wall of the container and the liquid, and
   means defining an opening in the cell for providing a stable capillary gas-liquid interface between gas in the cell and liquid in the container so that none of the liquid penetrates the cell during steady state conditions.

8. The insulation of claim 7 wherein said individual discrete cell is tubular in configuration and has a covering on at least one end thereof, said opening being located in said covering.

9. Insulation for providing a gas insulating layer between a wall of a container and a liquid having a low boiling temperature in the container, said insulation comprising:
   at least one panel for mounting on the wall of the container,
   said panel comprising a honeycomb core structure comprising a plurality of ribbons defining a plurality of cells for maintaining a gas column between the wall of the container and the liquid,
   a covering means closing the end of the cells of said panel adjacent the liquid and having openings therein for providing a stable capillary gas-liquid interface thereat between gas in the cells and liquid in the container so that none of the liquid penetrates the cells during steady state conditions, and
   means in one of the ribbons for providing gas communication between the adjacent calls defined thereby.

10. The insulation of claim 9 further including another covering over the other end of the cells, and adhesive means for cooperating with said another covering for securing said panel to a container wall.

11. Insulation for providing a gas insulating layer between the walls of a container and a liquid having a low boiling temperature in the container, said insulation comprising:
   at least one panel mounted on the wall of the container,
   said panel comprising a honeycomb core structure defining a plurality of cells for maintaining a gas column between the wall of the container and the liquid,
   a first covering means closing the one end of the cells adjacent the liquid and having an opening therein for providing a stable capillary gas-liquid interface thereat between gas in the cell and liquid in the container so that none of the liquid penetrates the cells during steady state conditions,
   a second covering over the other end of the cells, and adhesive means adhered to said wall and in which said second covering is at least partially immersed for securing said panel to the container wall.

12. The insulation of claim 11 wherein said honeycomb core structure is formed of a plurality of ribbons and at least a portion of one edge of the ribbons is embedded in the adhesive means.

13. The insulation of claim 11 wherein said second covering comprises a fibrous material which is embedded in an adhesive layer on the container wall.

14. The insulation of claim 11 further including another panel mounted on the wall adjacent the one panel and sealing means interposed between said panels for blocking flow of liquid between said panels and into contact with the container wall.

15. Insulation for providing a gas insulating layer between the walls of a container and a liquid having a low boiling temperature in the container, said insulation comprising:
   a plurality of panels mounted on the wall of the container,
   each of said panels comprising a honeycomb core structure defining a plurality of cells for maintaining a gas column between the wall of the container and the liquid,
   a covering means closing the end of the cells adjacent the liquid and having an opening therein for providing a stable capillary gas-liquid interface thereat between gas in the cell and liquid in the container so that none of the liquid penetrates the cells during steady state conditions,
   means securing said panels to the container wall, and
   means interposed between said panels for blocking flow of the low boiling temperature liquid between the panels and into contact with the wall of the container.

16. The insulation of claim 15 wherein said last mentioned means comprises a fluid seal between said panels which comprises an adhesive-cork mixture.

17. Insulation for providing a gas insulating layer between a first wall of a container and liquid having a low boiling temperature in the container, said insulation comprising:
   at least one panel mounted on the first wall of the container,
   said panel comprising a honeycomb core structure defining a plurality of cells for maintaining a gas column between the wall of the container and the liquid,
   a covering means closing the end of the cells adjacent the liquid and having an opening therein for providing a stable capillary gas-liquid interface thereat between gas in the cell and liquid in the container so that none of the liquid penetrates the cells during steady state conditions,
   means securing said panel to the container wall, and
   means interposed between said panel and a second wall of the container which extends angularly from the first wall for providing a seal therebetween for blocking flow of the low boiling temperature liquid between the panel and second wall and into contact with the first wall of the container.

18. The insulation of claim 17 wherein said last mentioned means interposed between said panel and second wall comprises a sealing mixture.

References Cited

UNITED STATES PATENTS

| | | | |
|---|---|---|---|
| 3,365,897 | 1/1968 | Middleton et al. | 62—45 |
| 2,676,775 | 4/1954 | Sanz et al. | 220—9 A X |
| 2,859,895 | 11/1958 | Beckwith | 220—65 |
| 2,937,780 | 5/1960 | Beckwith | 220—9 LG |
| 2,947,438 | 8/1960 | Clauson | 220—15 |
| 3,018,018 | 1/1962 | Beckwith | 220—63 |
| 3,019,937 | 2/1962 | Morrison | 220—9 LG X |
| 3,150,794 | 9/1964 | Schlumberger et al. | 220—9 LG |
| 3,208,621 | 9/1965 | Dawson | 220—9 LG |
| 3,261,087 | 7/1966 | Schlumberger et al. | 220—9 A X |
| 3,325,037 | 6/1967 | Kohn et al. | 220—9 A |

MEYER PERLIN, Primary Examiner

R. C. CAPOSSELA, Assistant Examiner

U.S. Cl. X.R.

220—9 LG, 15